United States Patent
Teramoto et al.

(10) Patent No.: US 12,005,786 B2
(45) Date of Patent: Jun. 11, 2024

(54) ELECTRIC ROLLING STOCK CONTROL APPARATUS

(71) Applicant: MITSUBISHI ELECTRIC CORPORATION, Tokyo (JP)

(72) Inventors: Kota Teramoto, Tokyo (JP); Yoshinori Chiba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 358 days.

(21) Appl. No.: 17/441,346

(22) PCT Filed: Mar. 29, 2019

(86) PCT No.: PCT/JP2019/014077
§ 371 (c)(1),
(2) Date: Sep. 21, 2021

(87) PCT Pub. No.: WO2020/202273
PCT Pub. Date: Oct. 8, 2020

(65) Prior Publication Data
US 2022/0153145 A1 May 19, 2022

(51) Int. Cl.
*B60L 15/20* (2006.01)
*B60L 15/32* (2006.01)

(52) U.S. Cl.
CPC .............. *B60L 15/20* (2013.01); *B60L 15/32* (2013.01); *B60L 2200/26* (2013.01)

(58) Field of Classification Search
CPC ....... B60L 15/20; B60L 15/32; B60L 2200/26
See application file for complete search history.

(56) References Cited

U.S. PATENT DOCUMENTS

2019/0300028 A1 10/2019 Okada et al.

FOREIGN PATENT DOCUMENTS

| JP | 2003164004 A | 6/2003 |
| JP | 2005341784 A | 12/2005 |
| JP | 2011-142701 A | 7/2011 |
| WO | 2017216931 A1 | 12/2017 |

OTHER PUBLICATIONS

International Search Report (PCT/ISA/210) with translation and Written Opinion (PCT/ISA/237) dated Jun. 18, 2019, by the Japan Patent Office as the International Searching Authority for International Application No. PCT/JP2019/014077. (8 pages).
Office Action dated Apr. 11, 2022, issued in corresponding Indian Patent Application No. 202127042768, 6 pages.
Office Action (Notice of Reasons for Refusal) dated Nov. 16, 2021, in corresponding Japanese Patent Application No. 2021-510610 and English translation of the Office Action. (7 pages).
Hearing Notice dated Feb. 29, 2024, issued in the corresponding Indian Patent Application No. 202127042768, 2 pages.

*Primary Examiner* — Michael D Lang
(74) *Attorney, Agent, or Firm* — BUCHANAN INGERSOLL & ROONEY PC

(57) ABSTRACT

An electric rolling stock control apparatus includes: a plurality of propulsion control devices that each control an electric motor for driving a car of a train, the electric motor being installed on the car, the train including a plurality of the cars; and a train information management device that calculates power necessary for the entire train, wherein the propulsion control devices each determine power according to a predetermined condition.

4 Claims, 6 Drawing Sheets

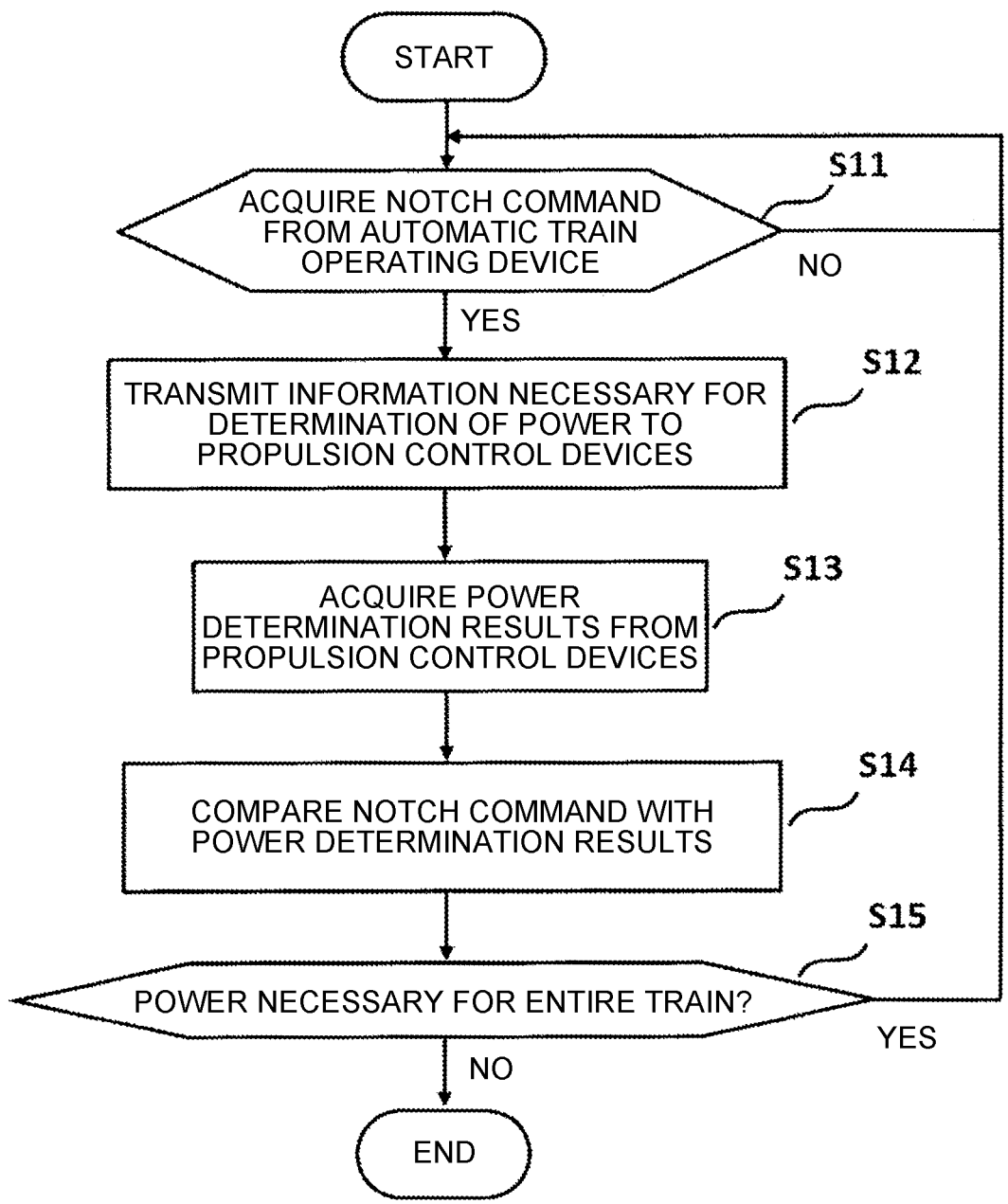

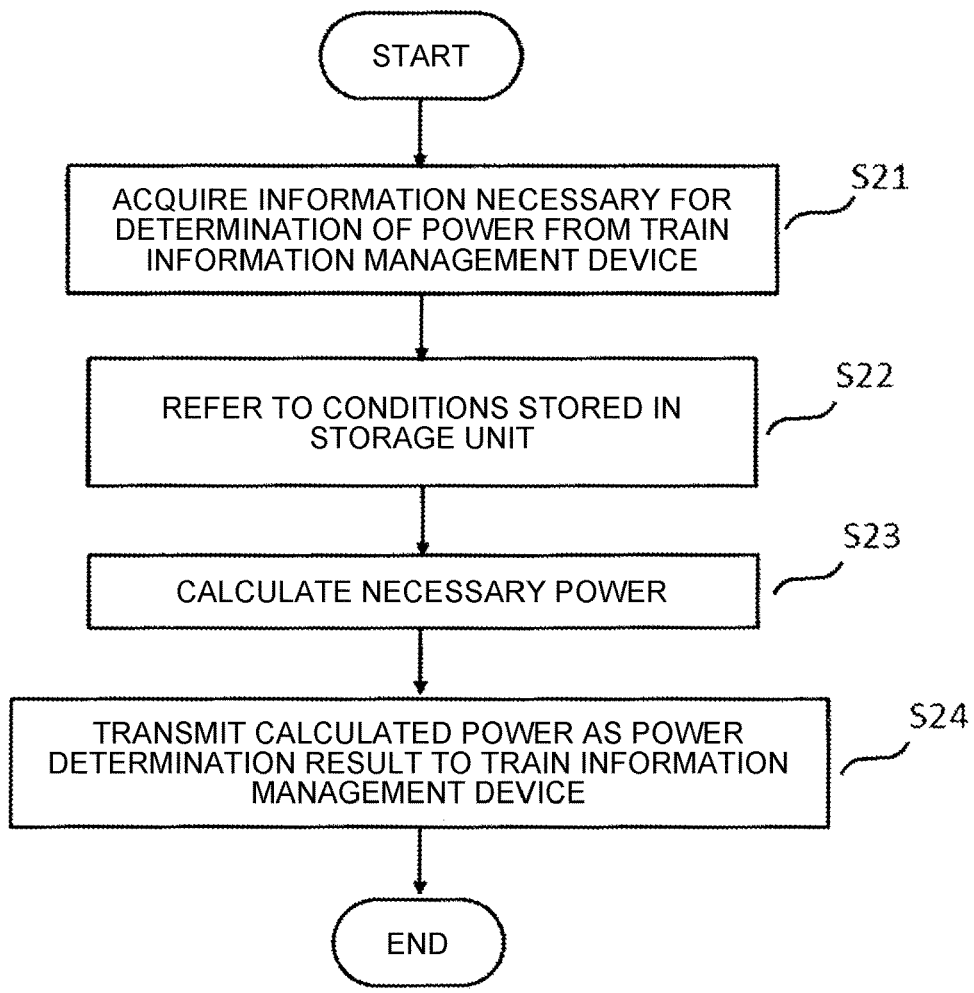

| | PROPULSION CONTROL DEVICES | | | |
|---|---|---|---|---|
| | 20-1 | 20-2 | 20-3 | 20-4 |
| UP LINE | 1 | 0 | 1 | 0 |
| DOWN LINE | 0 | 1 | 0 | 1 |

| | PROPULSION CONTROL DEVICES | | | |
|---|---|---|---|---|
| | 20-1 | 20-2 | 20-3 | 20-4 |
| POWER | ×1/2 | ×1/2 | ×1/2 | ×1/2 |

ELECTRIC ROLLING STOCK CONTROL APPARATUS

FIELD

The present invention relates to an electric rolling stock control apparatus.

BACKGROUND

In the conventional train control, control has been performed so as to reduce power consumption in which the electric motors of selected power cars are driven with load torque concentrated thereon, and the electric motors of the other power cars are stopped. For example, Patent Literature 1 discloses control in which a power car is selected. Patent Literature 1 describes performing optimum notch control so as to reduce power consumption in a distributed traction system train.

CITATION LIST

Patent Literature

Patent Literature 1: Japanese Patent Application Laid-open No. 2003-164004

SUMMARY

Technical Problem

In the technique disclosed in Patent Literature 1, a central control unit determines an operation suspension command and a notch command, and transmits the operation suspension command and the notch command as control commands to each car. In addition, a control transmission terminal device of each car controls a main electric motor based on the control commands transmitted to the car.

However, in order to perform control with power necessary for the entire train, the central control unit needs to monitor whether the control commands transmitted to each car match the control state of each car. Thus, there has been a problem that the processing load of the central control unit is large.

Solution to Problem

An electric rolling stock control apparatus according to the present invention includes: a plurality of propulsion control devices to each control an electric motor for driving a car of a train, the electric motor being installed on the car, the train including a plurality of the cars; and a train information management device to calculate power necessary for the entire train. The propulsion control devices each determine power according to a predetermined condition.

Advantageous Effects of Invention

An electric rolling stock control apparatus according to the present invention includes: a plurality of propulsion control devices to each control an electric motor for driving a car of a train, the electric motor being installed on the car, the train including a plurality of the cars; and a train information management device to calculate power necessary for the entire train. The propulsion control devices each determine power according to a predetermined condition. Thus, it is possible to reduce the processing load of the train information management device.

BRIEF DESCRIPTION OF DRAWINGS

FIG. 4 is a diagram describing operation of a train information management device according to the embodiment.

FIG. 5 is a diagram describing operation of the propulsion control device according to the embodiment.

FIGS. 6A and 6B are diagrams showing examples of conditions for determining power, according to the embodiment.

DESCRIPTION OF EMBODIMENTS

Embodiment

Figure 1:
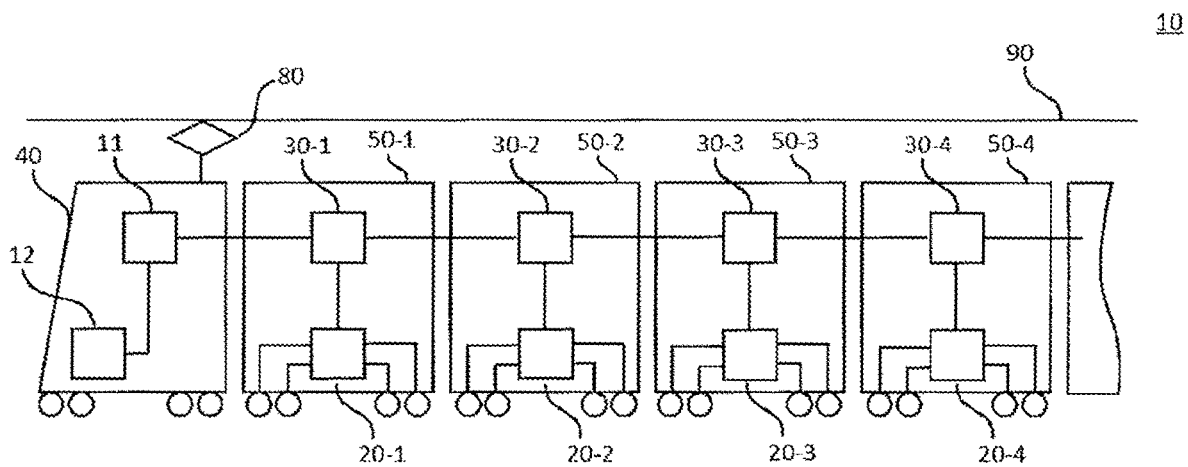
FIG. 1 is a diagram illustrating a configuration of a train according to an embodiment.

An electric rolling stock control apparatus 1 according to an embodiment is installed on, for example, a train 10 illustrated in FIG. 1. The train 10 includes a plurality of cars including cars 40 and 50-1 to 50-4. Although five cars are illustrated in FIG. 1, the number of cars may be equal to or less than four, or may be equal to or more than six. When the cars 50-1 to 50-4 are not distinguished from each other, the cars 50-1 to 50-4 are collectively referred to as cars 50. The train 10 is operated by electric power supplied from an overhead line 90 via a current collector 80. Hereinafter, the embodiment of the present invention will be described in detail with reference to the drawings. The embodiment to be described below is an example, and the present invention is not limited to the embodiment to be described below.

A train information management device 11 is installed on the car 40, and is connected to an automatic train operating device 12 and terminal devices 30-1 to 30-4 installed on the respective cars via transmission lines. When the terminal devices are not distinguished from each other, the terminal devices are collectively referred to as terminal devices 30. The train information management device 11 receives an operation command from the automatic train operating device 12. The train information management device 11 transmits control commands to the terminal devices 30. The train information management device 11 receives responses to the control commands from the terminal devices 30.

The automatic train operating device 12 generates a notch command serving as an operation command necessary for the running of the train 10, and transmits the notch command to the train information management device 11. Propulsion control devices 20-1 to 20-4 are connected to the respective terminal devices 30 via transmission lines, and receive control commands from the respective terminal devices 30. When the propulsion control devices are not distinguished from each other, the propulsion control devices are collectively referred to as propulsion control devices 20. The propulsion control devices 20 are each connected to an electric motor (not illustrated) and perform control to drive the electric motor. A single propulsion control device 20 may control a single electric motor, or may control a plurality of electric motors.

The cars 50 are each a power car that can be driven by the electric motor. In addition, the car 40 is an unpowered car that is not driven by the electric motor. Although four power cars are illustrated in FIG. 1, the number of power cars may be equal to or less than three or may be equal to or more than five as long as the number of power cars is equal to or more than two. In the embodiment, a case where there are four power cars will be described. Furthermore, in the embodiment, in order to facilitate description, a case where a single propulsion control device 20 controls a single power car will be described.

Figure 2:
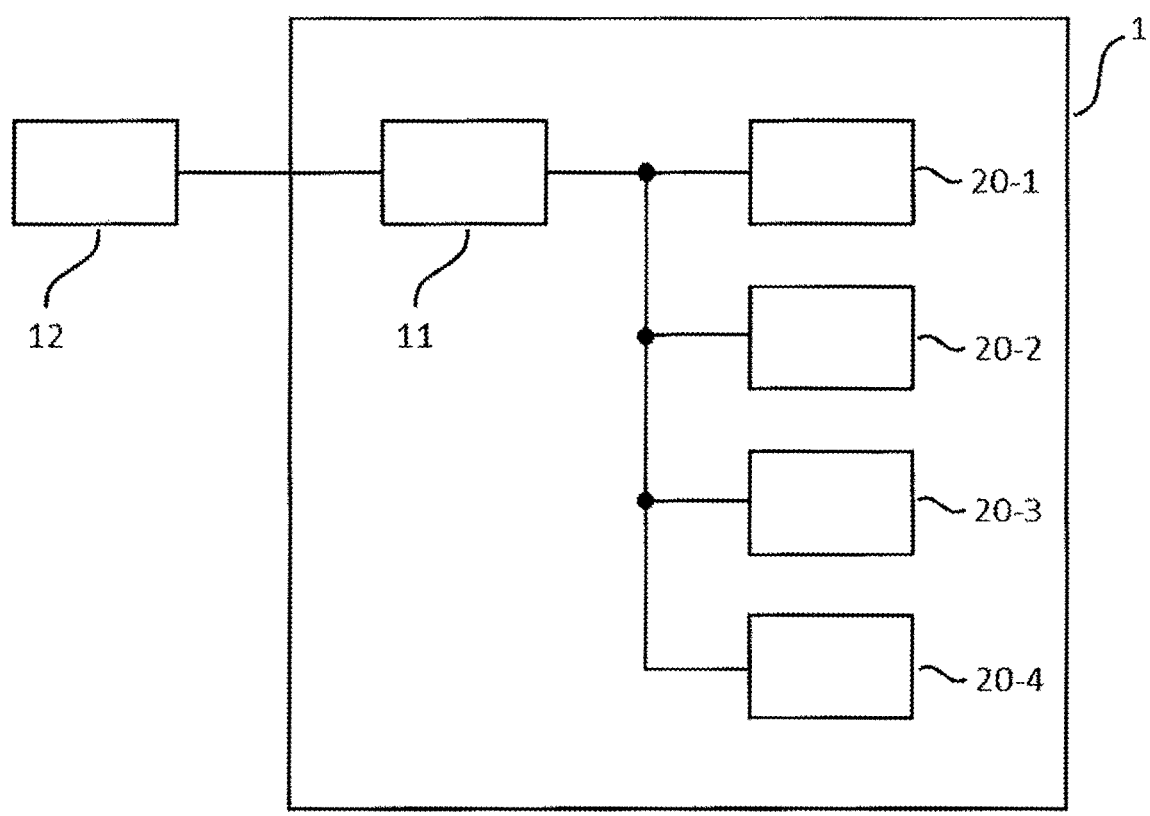
FIG. 2 is a diagram illustrating a schematic configuration of an electric rolling stock control apparatus according to the embodiment.

FIG. 2 is a diagram illustrating a schematic configuration of the electric rolling stock control apparatus 1 according to the embodiment. The electric rolling stock control apparatus 1 for electric rolling stock including a plurality of cars includes the train information management device 11 and the propulsion control devices 20.

Figure 3:
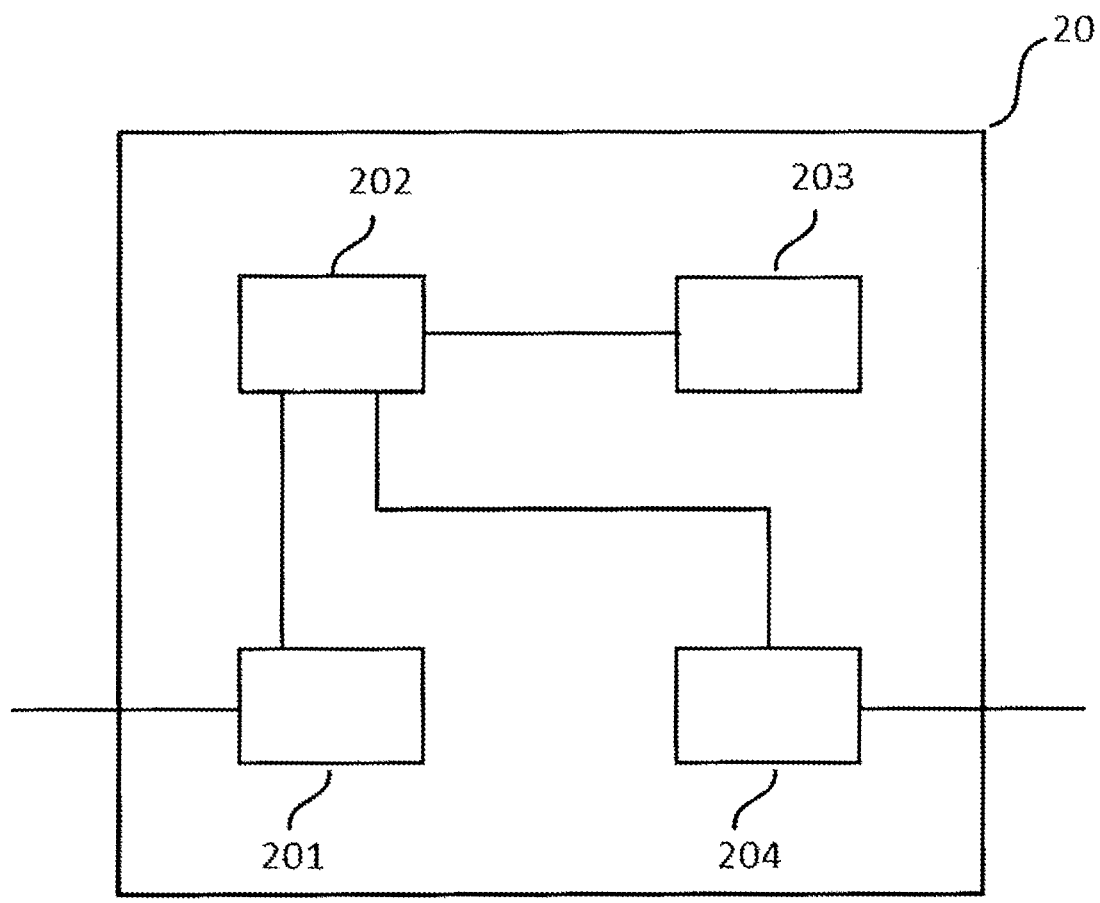
FIG. 3 is a diagram illustrating a schematic configuration of a propulsion control device according to the embodiment.

FIG. 3 is a diagram illustrating a schematic configuration of the propulsion control device 20. The propulsion control device 20 includes a communication unit 201, a processing unit 202, a storage unit 203, and an electric motor control unit 204.

The communication unit 201 is an interface for communicating with the terminal device 30. The communication unit 201 receives a control command from the terminal device 30, and transmits a power determination result to be described below to the terminal device 30.

The processing unit 202 determines power for the propulsion control device 20. The processing unit 202 transmits a power determination result to the communication unit 201. In addition, the processing unit 202 transmits power necessary for driving the electric motor to the electric motor control unit on the basis of the power determination result.

The storage unit 203 stores in advance conditions necessary for the processing unit 202 to determine power.

The electric motor control unit 204 controls the electric motor on the basis of the necessary power transmitted from the processing unit 202.

Next, operation of the electric rolling stock control apparatus 1 will be described. FIG. 4 is a diagram describing operation of the train information management device 11 of the electric rolling stock control apparatus 1. The train information management device 11 acquires a notch command from the automatic train operating device 12 (S11). When no notch command is acquired (S11: No), the process returns to the start. When the notch command is acquired (S11: Yes), the train information management device 11 transmits, to the propulsion control devices 20, information necessary for the propulsion control devices 20 to determine power (S12). The train information management device 11 acquires results of power determination made by the propulsion control devices 20 from the propulsion control devices 20 (S13). The train information management device 11 compares the notch command acquired from the automatic train operating device 12 with the power determination results acquired from the propulsion control devices 20 (S14). The train information management device 11 checks whether the power determination results match the power necessary for the entire train, based on the comparison (S15). For example, when the train information management device 11 determines that the sum of the power determination results does not match the power necessary for the entire train as a result of comparing the notch command with the sum of the respective power determination results acquired from the propulsion control devices 20 (S15: No), the process ends. For example, when the train information management device 11 determines that the sum of the power determination results matches the power necessary for the entire train as a result of comparing the notch command with the sum of the respective power determination results acquired from the propulsion control devices 20 (S15: Yes), the process returns to the start to repeat the processing. In S15, the train information management device 11 compares the notch command with the sum of the respective power determination results acquired from the propulsion control devices 20, and checks whether the sum of the power determination results matches the power necessary for the entire train. Thus, the train information management device 11 monitors that the entire train can be controlled with the power necessary for the entire train, based on the command from the automatic train operating device 12.

Here, examples of the information necessary for determination of power, transmitted from the train information management device 11 to the propulsion control devices 20 include the notch command from the automatic train operating device 12 and information on the power necessary for the entire train based on the notch command from the automatic train operating device 12.

FIG. 5 is a diagram describing operation of the propulsion control device 20. The propulsion control device 20 acquires information necessary for determination of power, from the train information management device 11 (S21). The propulsion control device 20 refers to the conditions necessary for determination of power, stored in the storage unit 203 (S22). The propulsion control device 20 calculates necessary power based on the information acquired from the train information management device 11 and the conditions stored in the storage unit 203 (S23). The propulsion control device 20 transmits the calculated power, as a power determination result, to the train information management device 11 (S24). Here, examples of the conditions necessary for determination of power include a condition for determining the presence or absence of operation and a condition for determining power.

FIG. 6 is a diagram showing examples of the conditions stored in advance in the storage unit 203 of the propulsion control device 20. FIG. 6A illustrates predetermined conditions 1, and FIG. 6B illustrates a predetermined condition 2. The predetermined conditions 1 illustrated in FIG. 6A correspond to the condition for determining the presence or absence of operation. The propulsion control device to be operated is determined depending on whether the train 10 runs on an up line or a down line. In FIG. 6A, when the train 10 runs on the up line, the propulsion control devices 20-1 and 20-3 operate, and the propulsion control devices 20-2 and 20-4 do not operate. Things other than the up line and the down line may be set as the condition regarding the presence or absence of operation. For example, it is also possible to set conditions such as a date and time, a day of the week, a car weight, kilometrage, a route, and a type (local train, rapid train, or the like). In a case where the number of passengers of the train 10 is large, such as the case of a train service during commuter hours, more power may be required for the entire train than in a case where the number of passengers of the train 10 is small. In such a case, conditions such as a date and time, a day of the week, and a car weight may be set as conditions for increasing the number of the propulsion control devices 20 to be operated.

The predetermined condition 2 illustrated in FIG. 6B corresponds to the condition for determining power. In FIG. 6B, it is specified that power is doubled. Other things may be set as conditions for determining power. For example, it is also possible to set conditions such as a date and time, a day of the week, weight, kilometrage, a route, and a type. For example, in a case where it is desired to set different power for each propulsion control device 20 depending on the position of the train, kilometrage may be set as a condition. Setting kilometrage as a condition enables the propulsion control device 20-1 and the propulsion control device 20-3 to be driven with different power from a kilometrage X to a kilometrage Y.

Figures 7, 8A, 8B:
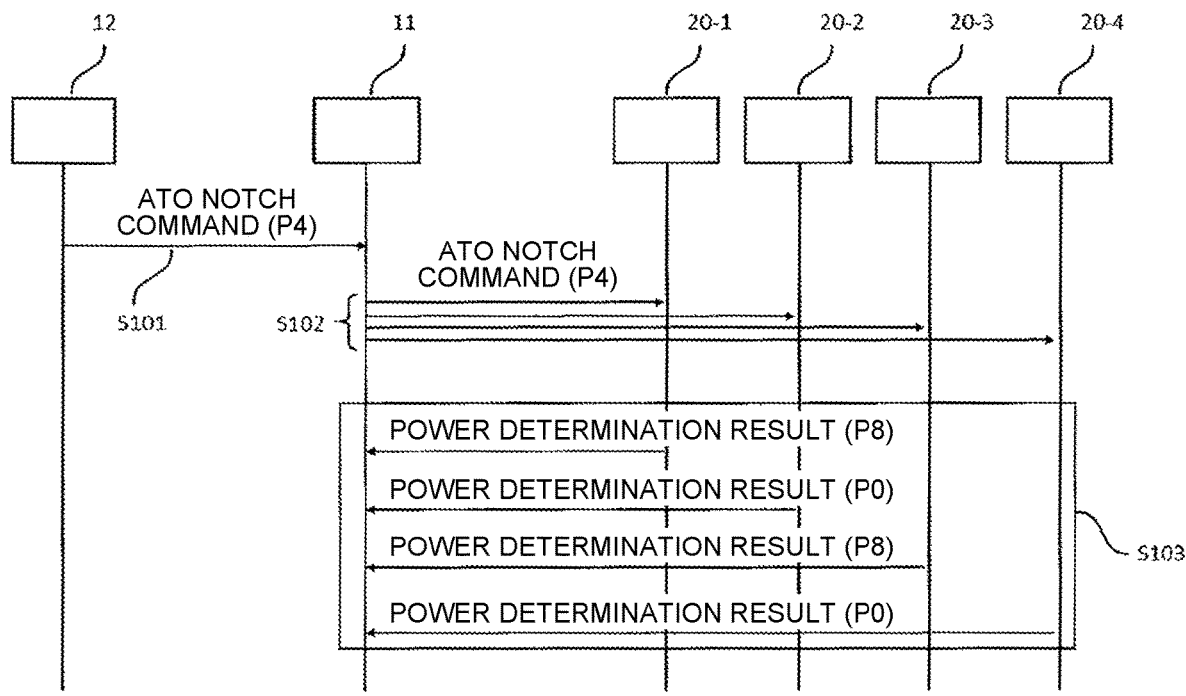
FIG. 7 is a diagram showing an example of operation of the electric rolling stock control apparatus according to the embodiment.
FIGS. 8A and 8B are diagrams showing other examples of conditions for determining power, according to the embodiment.

FIG. 7 is a diagram describing an example of the operation of the electric rolling stock control apparatus 1. As an example, a case where the train 10 runs on the up line will be described. The terminal devices 30 are omitted. In S101, in order to cause the train 10 to run, the automatic train operating device 12 outputs four notches (P4) as an automatic train operation (ATO) notch command. In S102, the train information management device 11 transmits the ATO notch command (P4) to all the propulsion control devices. Each propulsion control device 20 determines power based on the conditions of FIG. 6. For example, in the case of the propulsion control device 20-1, since the train 10 is running on the up line, it is determined based on the condition of FIG. 6A that the propulsion control device 20-1 corresponds to a propulsion control device that operates. Next, it is determined based on the condition of FIG. 6B that the power is doubled. On the basis of the ATO notch command from the train information management device 11, the condition for determining the presence or absence of operation in FIG. 6A, and the condition for determining power in FIG. 6B, the propulsion control device 20-1 calculates its own power as follows: the ATO notch command (4)×the presence or absence of operation (1)×power (2)=8. In S103, the propulsion control device 20-1 transmits the calculation result as a power determination result (P8) to the train information management device 11. The propulsion control devices 20-2 to 20-4 similarly calculate their own power, and transmit their respective calculation results (P0), (P8), and (P0) to the train information management device 11.

The train information management device 11 compares the ATO notch command acquired from the automatic train operating device 12 with the power determination results from the propulsion control devices 20. The train information management device 11 knows in advance that the train has been equipped with four propulsion control devices. It is determined from the ATO notch command (P4) that the power necessary for the entire train is (P4)×4=16 notches. In addition, power to be actually controlled is determined from the power determination results of the propulsion control devices 20-1 to 20-4. The power determination results of the propulsion control devices 20-1 to 20-4 are added up, and it is determined that the sum of the power determination results for the entire train is 8+0+8+0=16 notches. Next, the power necessary for the entire train based on the ATO notch command is compared with the sum of the power determination results from the propulsion control devices 20. The power necessary for the entire train and the sum of the power determination results are both equal to 16 notches. As a result, the train information management device 11 determines that the entire train can be controlled with the power necessary for the entire train.

Figure 9:
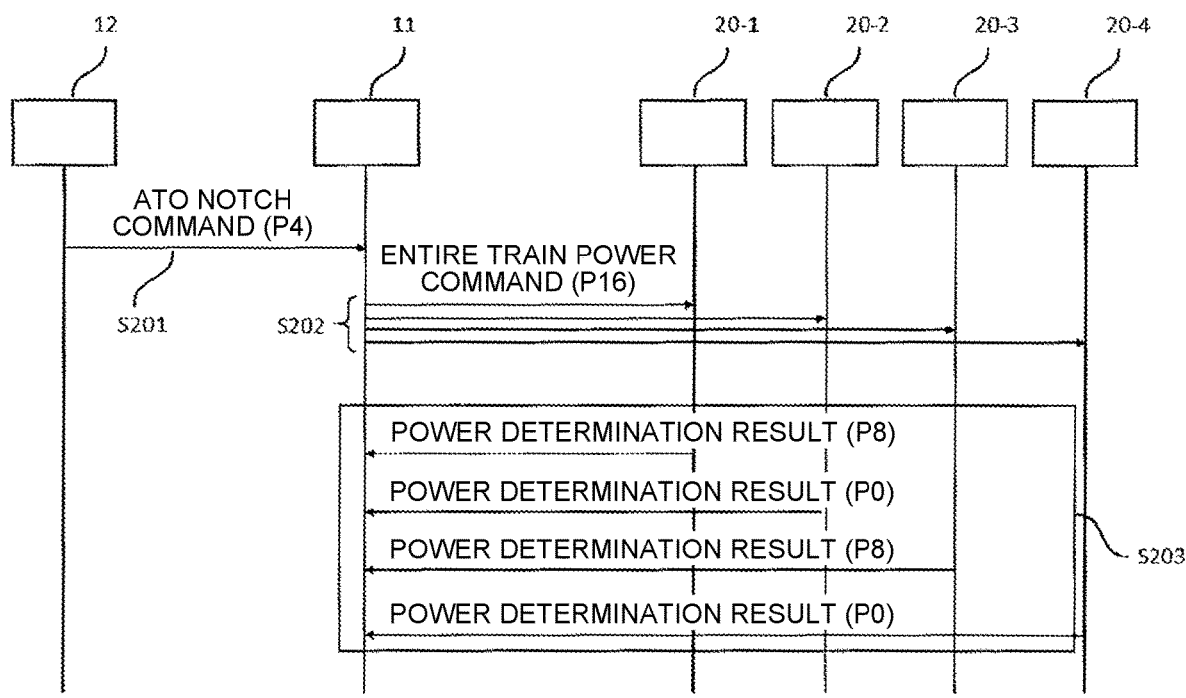
FIG. 9 is a diagram showing another example of the operation of the electric rolling stock control apparatus according to the embodiment.

FIGS. 8 and 9 are diagrams describing another example of the operation of the electric rolling stock control apparatus 1. Predetermined conditions 1 illustrated in FIG. 8A correspond to the condition for determining the presence or absence of operation. The propulsion control device 20 to be operated is determined depending on whether the train 10 runs on an up line or a down line. In FIG. 8A, when the train 10 runs on the up line, the propulsion control devices 20-1 and 20-3 operate, and the propulsion control devices 20-2 and 20-4 do not operate. Things other than the up line and the down line may be set as the condition for determining the presence or absence of operation. A predetermined condition 2 illustrated in FIG. 8B corresponds to the condition for determining power. In FIG. 8B, it is specified that power is halved.

As with the above example, a case where the train 10 runs on the up line will be described with reference to FIG. 9. The terminal devices 30 are omitted. In S201, in order to cause the train 10 to run, the automatic train operating device 12 outputs four notches (P4) as an ATO notch command. The train information management device 11 knows in advance that the train has been equipped with four propulsion control devices. On the basis of the ATO notch command (P4), the train information management device 11 determines that 16 notches ((P4)×4=16) are required as the power for the entire train. In S202, the train information management device 11 transmits a power command necessary for the entire train to all the propulsion control devices. Each propulsion control device 20 determines power based on the conditions of FIG. 8. For example, in the case of the propulsion control device 20-1, since the train 10 is running on the up line, it is determined based on the condition of FIG. 8A that the propulsion control device 20-1 corresponds to a propulsion control device that operates. Next, it is determined based on the condition of FIG. 8B that the power is halved. On the basis of the ATO notch command from the train information management device 11, the condition for determining the presence or absence of operation in FIG. 8A, and the condition for determining power in FIG. 8B, the propulsion control device 20-1 calculates its own power as follows: the power command necessary for the entire train (16)×the presence or absence of operation (1)×power (½)=8. In S203, the propulsion control device 20-1 transmits the calculation result as a power determination result (P8) to the train information management device 11. The propulsion control devices 20-2 to 20-4 similarly calculate their own power, and transmit their respective calculation results (P0), (P8), and (P0) to the train information management device 11.

As described above, the train information management device 11 knows that the ATO notch command (P4)×4=16 notches are required as the power for the entire train. In addition, power to be actually controlled is determined from the power determination results of the propulsion control devices 20-1 to 20-4. The power determination results of the propulsion control devices 20-1 to 20-4 are added up, and it is determined that the sum of the power determination results for the entire train is 8+0+8+0=16 notches. Next, the power necessary for the entire train based on the ATO notch command is compared with the sum of the power determination results from the propulsion control devices 20. The power necessary for the entire train and the sum of the power determination results are both equal to 16 notches. As a result, the train information management device 11 determines that the entire train can be controlled with the power necessary for the entire train.

As described above, in the electric rolling stock control apparatus 1 according to the embodiment, the train information management device 11 does not determine and transmit the presence or absence of operation or power for each propulsion control device. Therefore, it is not necessary to check consistency between a command and a response for each propulsion control device. The train information management device 11 just needs to monitor whether the entire train can be controlled with the power necessary for the entire train, so that a processing load for controlling the entire train is reduced.

As described above, in the electric rolling stock control apparatus 1 according to the embodiment, the propulsion control device 20 determines its own power based on predetermined conditions. This reduces a processing load of the train information management device 11 for controlling the entire train.

In the embodiment, it is desirable that the same conditions be stored in all the propulsion control devices 20 included in the train. Each propulsion control device determines power based on the same conditions. This reduces the processing load of the train information management device 11 for controlling the entire train.

In the embodiment, the command from the automatic train operating device 12 has been described as a command for causing the train 10 to run. Meanwhile, the command for causing the train 10 to run is not limited to the command from the automatic train operating device 12. For example, a command from a master controller operated by a train driver may be used as the command for causing the train 10 to run.

Although the case where a single propulsion control device 20 controls a single power car has been described in the embodiment, the present invention is also applicable to a case where a single propulsion control device 20 propels a plurality of power cars and a case where a plurality of the propulsion control devices 20 controls a single power car.

Figure 10:
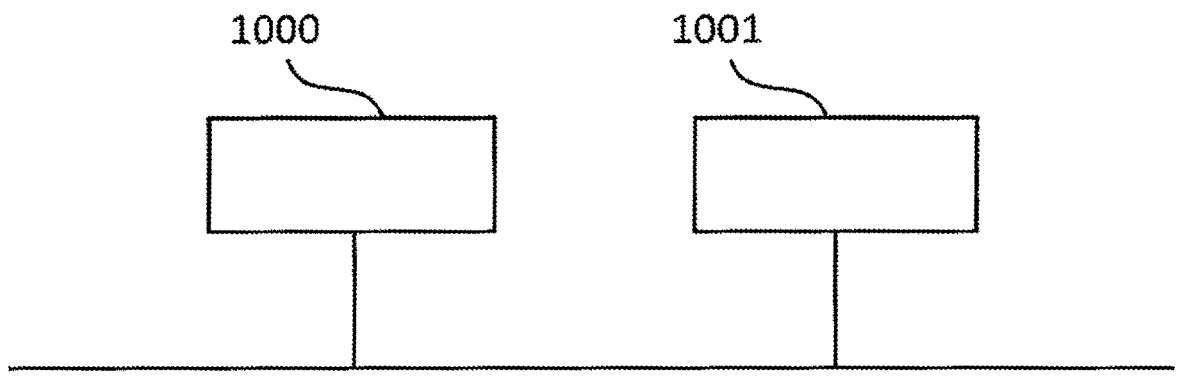
FIG. 10 is a diagram showing a general configuration example of hardware that implements the electric rolling stock control apparatus according to the embodiment.

FIG. 10 is a diagram showing an example of a case where processing circuitry included in each of the train information management device 11 and the propulsion control device 20 includes a processor and a memory. In a case where the processing circuitry includes a processor 1000 and a memory 1001, each function of the processing circuitry included in each of the train information management device 11 and the propulsion control device 20 is implemented by software, firmware, or a combination of software and firmware. The software or firmware is described as a program, and stored in the memory 1001. The processor 1000 reads and executes the program stored in the memory 1001 to implement each function of the processing circuitry. That is, the processing circuitry includes the memory 1001 for storing programs. As a result of execution of the programs, the train information management device 11 and the propulsion control device 20 are caused to perform processing. In addition, it can also be said that these programs cause a computer to execute the procedures and methods for the train information management device 11 and the propulsion control device 20.

The electric rolling stock control apparatus 1 according to the present invention includes a plurality of the propulsion control devices 20 that each control an electric motor for driving a car; and the train information management device 11 that calculates power necessary for the entire train, wherein the propulsion control devices 20 each determine power according to a predetermined condition. As a result, it is possible to reduce the processing load of the train information management device 11.

In the electric rolling stock control apparatus 1 according to the present invention, the train information management device 11 creates information based on an operation command, and transmits the information to the propulsion control devices 20, the information being necessary for the propulsion control devices 20 to determine power. As a result, it is possible to reduce the processing load of the train information management device 11.

In the electric rolling stock control apparatus 1 according to the present invention, each of the propulsion control devices 20 transmits a power determination result to the train information management device 11, the power determination result being a result of determination of power. As a result, it is possible to reduce the processing load of the train information management device 11.

In the electric rolling stock control apparatus 1 according to the present invention, the train information management device 11 monitors that the entire train is controlled with the power necessary for the entire train, based on the operation command and the power determination results. As a result, it is possible to reduce the processing load of the train information management device 11.

The electric rolling stock control apparatus 1 according to the present invention can reduce the processing load of the train information management device 11 by using, as the predetermined condition, a condition for determining the presence or absence of operation.

The electric rolling stock control apparatus 1 according to the present invention can reduce the processing load of the train information management device 11 by using, as the predetermined condition, a condition for determining power.

REFERENCE SIGNS LIST

1 electric rolling stock control apparatus; 10 train; 11 train information management device; 12 automatic train operating device; 20, 20-1, 20-2, 20-3, 20-4 propulsion control device; 30, 30-1, 30-2, 30-3, 30-4 terminal device; 40 unpowered car; 50, 50-1, 50-2, 50-3, 50-4 power car; 80 current collector; 90 overhead line; 201 communication unit; 202 processing unit; 203 storage unit; 204 electric motor control unit; 1000 processor; 1001 memory.

The invention claimed is:

1. An electric rolling stock control apparatus comprising:
a plurality of propulsion controllers to each control an electric motor for driving a car of a train, the electric motor being installed on the car, the train including a plurality of the cars; and
a train information controller for calculating power necessary for the entire train, wherein
the propulsion controllers each configured to determine presence or absence of operation according to a predetermined condition, each propulsion controller including a storage to store the predetermined condition.

2. The electric rolling stock control apparatus according to claim 1, wherein
the train information controller is configured to create information based on an operation command, and transmit the information to the plurality of propulsion controllers, the information being necessary for the propulsion controllers to determine the presence or absence of operation.

3. The electric rolling stock control apparatus according to claim 2, wherein
   each of the propulsion controllers is configured to transmit an operation determination result to the train information controller, the operation determination result being a result of determination of the presence or absence of operation.

4. The electric rolling stock control apparatus according to claim 3, wherein
   the train information controller is configured to monitor that the entire train is controlled with the power necessary for the entire train, based on the operation command and the operation determination results.

* * * * *